United States Patent
Horikx et al.

(10) Patent No.: US 9,553,664 B2
(45) Date of Patent: Jan. 24, 2017

(54) OPTICAL FREQUENCY DOMAIN REFLECTOMETRY (OFDR) SYSTEM

(71) Applicant: KONINKLIJKE PHILIPS N.V., Eindhoven (NL)

(72) Inventors: Jeroen Jan Lambertus Horikx, Weert (NL); Gert Wo 'T Hooft, Eindhoven (NL); Milan Jan Henri Marell, Noord Brabant (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/432,877

(22) PCT Filed: Sep. 16, 2013

(86) PCT No.: PCT/EP2013/069083
§ 371 (c)(1),
(2) Date: Apr. 1, 2015

(87) PCT Pub. No.: WO2014/060158
PCT Pub. Date: Apr. 24, 2014

(65) Prior Publication Data
US 2015/0263804 A1 Sep. 17, 2015

(30) Foreign Application Priority Data
Oct. 15, 2012 (EP) ..................... 12188515

(51) Int. Cl.
*H04B 10/071* (2013.01)
*H04B 10/25* (2013.01)
*G01M 11/00* (2006.01)

(52) U.S. Cl.
CPC ........ *H04B 10/071* (2013.01); *G01M 11/3172* (2013.01); *G01M 11/3181* (2013.01); *H04B 10/25* (2013.01)

(58) Field of Classification Search
CPC .. H04B 10/071; H04B 10/25; G01M 11/3172; G01M 11/3181
(Continued)

(56) References Cited

U.S. PATENT DOCUMENTS 7,042,573 B2  5/2006 Froggatt
7,061,621 B2  6/2006 Krause
(Continued)

OTHER PUBLICATIONS

Soller, B.J. et al "Polarization resolved measurement of Rayleigh backscatter in fiber-optic components", OFC Technical Digest 2005, paper NWD3.

*Primary Examiner* — Dalzid Singh

(57) ABSTRACT

There is presented an optical frequency domain reflectometry (OFDR) system (100) comprising a first coupling point (15) arranged for splitting radiation into two parts, so that radiation may be emitted into a reference path (16) and a measurement path (17). The system further comprises an optical detection unit (30) capable of obtaining a signal from the combined optical radiation from the reference path and the measurement path via a second coupling point (25). The measurement path (17) comprises a polarization dependent optical path length shifter (PDOPS, PDFS, 10), which may create a first polarization (P1) and a second polarization (P2) for the radiation in the measurement path, where the optical path length is different for the first and second polarizations in the measurement path. This may be advantageous for obtaining an improved optical frequency domain reflectometry (OFDR) system where e.g. the two measurements for input polarizations may be performed in the same scan of a radiation source.

13 Claims, 8 Drawing Sheets

(58) Field of Classification Search
USPC .......................................................... 398/16
See application file for complete search history.

(56) References Cited

U.S. PATENT DOCUMENTS

| | | |
|---|---|---|
| 7,227,645 B2 | 6/2007 | Cyr |
| 7,538,883 B2 | 5/2009 | Froggatt |
| 7,595,879 B2 | 9/2009 | Wang |
| 8,149,419 B2 | 4/2012 | Fan et al. |
| 8,699,122 B2 | 4/2014 | Mikami |
| 8,711,359 B2 | 4/2014 | Fukushima |
| 2007/0086017 A1 | 4/2007 | Buckland et al. |
| 2009/0103100 A1* | 4/2009 | Froggatt ............ G01M 11/3172 356/477 |
| 2010/0134783 A1* | 6/2010 | Omichi ................ G01B 11/18 356/33 |
| 2011/0109898 A1 | 5/2011 | Froggatt et al. |
| 2012/0194823 A1 | 8/2012 | Moore et al. |
| 2014/0112615 A1* | 4/2014 | Kreger ................ G01B 11/16 385/13 |

\* cited by examiner

OPTICAL FREQUENCY DOMAIN REFLECTOMETRY (OFDR) SYSTEM

CROSS-REFERENCE TO PRIOR APPLICATIONS

This application is the U.S. National Phase application under 35 U.S.C. §371 of International Application Serial No. PCT/EP2013/069083, filed on Sep. 16, 2013, which claims the benefit of EP Application Serial No. 12188515.6, filed on Oct. 15, 2012. These applications are hereby incorporated by reference herein.

FIELD OF THE INVENTION

The present invention relates to systems for optical analysis, more particularly the present invention relates to an optical frequency domain reflectometry (OFDR) system and a method for a method for obtaining optical frequency domain reflectometry data.

BACKGROUND OF THE INVENTION

In Optical Frequency Domain Reflectometry (OFDR), light from a tunable laser source is coupled into a measurement fiber, or more generally, a device under testing (DUT), and the reflected or backscattered light is made to interfere with light from the same source that has traveled along a reference path yielding information about the fiber, or the DUT.

For measurements on a fiber, in the case that the frequency of the laser source is swept linearly in time, the interference between the light that is coming from a single fixed scattering point on the measurement fiber and the reference light creates a detector signal that has a constant frequency, this frequency being proportional to the difference of the travel time of the light along the measurement path and the reference path. As the propagation velocity of the light and the length of the reference path are known, the position of the scattering point can be computed from the observed frequency.

When multiple scatterers are present in the measurement fiber, the detector signal will be a superposition of different frequencies, each frequency indicative of the position of the respective scatterer. A Fourier transform of the detector signal (a 'scattering profile') can be computed; in graphs of the amplitude and phase of the transformed signal, the amplitude and phase of the different frequencies that are present in the detector signal (which correspond to different scatterer positions) will be shown at their respective positions along the horizontal axis of the graph.

The amplitude and phase of the scattered light can be affected by external influences acting on the fiber. E.g., when the fiber is deformed by external stresses, or when the temperature of the fiber is modified, effects will be seen on the phase and/or amplitude of the scattering profile. From a comparison of the scattering profile of the fiber to the scattering profile of the same fiber in a reference state, information can be obtained about the external influences on the fiber as a function of position along the fiber; i.e. the fiber can be used for distributed sensing.

When stresses are applied to an optical fiber, e.g. when it is bent, birefringence is induced, which in general will cause a variation of the state of polarization of the light travelling along the fiber. The polarization state of light scattered at different positions of the fiber upon arrival at the detector will vary as well. Thus, light reflected from certain parts of the sensing fiber may have a polarization state at the detector, which is (nearly) orthogonal to the polarization state of the light that arrives at the detector via the reference path. Consequently, the strength of the interference signal coming from these certain parts of the sensing fiber will be very low. A known solution to this problem of 'polarization fading' is polarization-diverse detection, usually in the embodiment of a polarizing beam splitter (PBS) with separate detectors for the two polarization states transmitted by the PBS.

In a birefringent fiber, the refractive index depends on the state of polarization of the light. Consequently, the phases of the Fourier transforms of the detector signals in a polarization-diverse measurement will vary upon modification of the input polarization state of the light that is sent into the measurement fiber. In order to accurately assess the effect of an external influence on the fiber properties two measurements need to be performed; for the second measurement the input polarization state of the light sent to the fiber is made orthogonal to the polarization state used in the first measurement. In this manner, four detector signals are obtained (two detector signals for each of the two input polarization states). From the Fourier transforms of these four signals, a single effective scattering profile may be computed that, when compared to the effective scattering profile of the reference state, provides the desired information about the external influences on the fiber as a function of position. See, e.g. patent application US20110109898 A1. The length of the intermediate measurement time between the first measurement and the second measurement may, however, in some situations negatively affect the reliability of the result. Similarly, the dependency on two measurements rather than a single measurement can also reduce the effective rate at which the measurement process can be reliably repeated, e.g. if one measurement (i.e. a scan) is corrupt, due e.g. a wrong detector signal, the wavelength calibration and/or linearization could be incorrect or unusable, then the entire measurement process must be repeated.

WO 2007149230 discloses a polarization maintaining (PM) optical fiber having two polarization states being analyzed. First and second spectral responses of the PM fiber portion are determined. In a preferred implementation, the spectral responses are determined using Optical Frequency Domain Reflectometry (OFDR). Each polarization state of the PM fiber portion has a corresponding spectral component in the first spectral response. First and second spectral analyses of the PM fiber portion are performed using the first and second spectral responses. Based on those spectral analyses of the PM fiber portion, a first physical characteristic affecting the PM fiber portion is determined that is distinct from a second different physical characteristic affecting the fiber portion. An output signal related to the first physical characteristics affecting the fiber portion is provided, e.g., for display, further processing, etc.

The inventors of the present invention have appreciated that an improved Optical Frequency Domain Reflectometry (OFDR) system is of benefit, and have in consequence devised the present invention.

SUMMARY OF THE INVENTION

It would be advantageous to achieve an improve Optical Frequency Domain Reflectometry (OFDR) system. It would also be desirable to enable an OFDR system working faster and/or more accurate. In general, the invention preferably seeks to mitigate, alleviate or eliminate one or more of the above-mentioned disadvantages singly or in any combination. In particular, it may be seen as an object of the present invention to provide a system and a method that solves the above mentioned problems, or other problems, of the prior art.

To better address one or more of these concerns, in a first aspect of the invention an optical frequency domain reflectometry (OFDR) system is provided, the system comprising:

an optical radiation source capable of emitting optical radiation within a certain wavelength band, the radiation source being optically connected to a first coupling point arranged for splitting the radiation into two parts, a reference path, the reference path being optically connected to the first coupling point, a measurement path, the measurement path being optically connected to the first coupling point, the measurement path further comprising an optical circulator, the circulator being optically connected to a measurement branch arranged for measurements based on reflected radiation, wherein said reference path and said measurement path are optically coupled in a second coupling point, an optical detection unit capable of obtaining a signal from the combined optical radiation from the reference path and the measurement path via the second coupling point, wherein the measurement path comprises a polarization dependent optical path length shifter (PDOPS), the shifter having the function of inducing, or creating, a first polarization (P1) and a second polarization (P2) for the radiation in the measurement path, said first polarization (P1) being different from said second polarization (P2), and characterized in that the shifter further having the function that the optical path length is different for the first polarization (P1) in the measurement path relative to the second polarization (P2) in the measurement path, the measurement branch comprises an optical fiber arranged for providing reflections for OFDR along a sensing length ($l_s$) of the optical fiber, and wherein the polarization dependent optical path length shifter (PDOPS) is further arranged so that the optical path length difference ($\Delta_{PDOS}$) between the first polarization (P1) and the second polarization (P2) in the reflection spectrum is chosen so as to avoid overlap in the reflection spectrum between the first polarization (P1) and the second polarization (P2).

The invention is particularly, but not exclusively, advantageous for obtaining an improved optical frequency domain reflectometry (OFDR) system where e.g. the two measurements for input polarizations may be performed in the same scan of the radiation source, e.g. the laser scan. To make this possible, appropriate components are added to the measurement branch of the interferometer, in between the splitter that distributes the radiation over the reference path, or arm, and the measurement path, or arm, and the circulator in the measurement path to which the measurement branch, e.g. the sensing fiber, is attached, such that (1) two polarization states are created, or induced, and (2) the optical path length in the measurement path is different for these two polarization states.

It is worth mentioning that up until now OFDR systems have had several disadvantages:

Firstly, measuring the fiber properties for two orthogonal input states requires two separate measurements. Because these measurements are separated in time, changes in the environment of the fiber, e.g. due to intended fiber motion, unintended vibrations, temperature changes etc. will result in additional differences between the two measurements. In the analysis, the differences are assumed to be caused solely by the change of input polarization, resulting in errors in the single effective scattering profile that is computed from the signals of the two separate measurements.

Secondly, another disadvantage is related to the effective update rate in the case that some of the measurements are corrupted. By alternating between two orthogonal input states for each laser scan, an updated single effective scattering profile can be computed from each new laser scan and the previous scan. However, when a single measurement is corrupted by whatever influence (e.g. laser mode hop, strong vibration etc.) two updated effective scattering profiles must be discarded, reducing the effective update rate.

Thirdly, compared to the prior art solutions it is an additional advantage of the invention that no difference in the calibration can occur between the two input polarizations, thereby removing a possible source of inaccuracy.

These disadvantages may be mitigated, or overcome by the present invention, because of the ability to measure the effect of the said first polarization (P1) and the second polarization (P2) in the measurement path, in particular in the measurement branch, during a relative short time as compared to previous ways of doing OFDR measurements.

In the context of the present application, it is to be understood that a scan of the said wavelength band of the radiation source may be considered to include, but not limited to, a substantially continuous variation of the wavelength in an appropriate interval. Under practical conditions, it is further understood that a scan may also be considered as a relatively large number of wavelengths, preferably homogeneously distributed, measured in a fixed order, typically from one end to the other of the interval.

In the context of the present application, it is to be understood that the polarization difference of the first and second polarization, resulting from the polarization dependent optical path length shifter (PDOPS), may in some situations may be induced, e.g. by polarization controller (pc), and in other situations created, e.g. by a polarization beam splitter (PBS), as it will be comprehended by a person skilled in optics.

In the context of the present application, it is to be understood that an optical circulator is a non-reversible optical component, where radiation, or light, entering from a first port, exits from a second port and then, upon reentering the optical circulator via the second port, the radiation exits the circulator from a third port thereby causing separation between radiation entering the first port and exiting the third port. It would be appreciated by the skilled person in optics that various suitable optical circulators may be applied in the context of the present invention.

In the context of the present application, it is to be understood that the optical path length (OPL) may be considered to be the product of the geometric length and the index of refraction of the medium through which the radiation, or light, is propagating. Optical path length is important because it determines the phase of the light and governs interference and diffraction of light as it propagates.

In the context of the present application, it is to be understood that the polarization, e.g. the first and second polarization, may be linearly, circularly or elliptically polarized depending on the circumstances and the application of the invention.

It is therefore envisioned that the present invention may facilitate a broad spectrum of use.

The invention is applicable in all fields where distributed sensing using the method of polarization-diverse Optical Frequency Domain Reflectometry can be used. Properties that can be measured with this technique are, e.g., strain and temperature. A field of particular interest might be the simultaneous measurement of strain in cores of a helical multi-core fiber, for the purpose of shape-sensing, in particular for medical applications.

The measurement branch of the OFDR system may also find application in other areas of optics, e.g. telecommunication, where such detection and analysis is required.

In specific embodiments, there may be more than one optical fiber, such as 2, 3, 4, 5, 6, 7, 8, 9 or more optical fibers. In specific embodiments, one or more optical fibers may be placed centrally. In specific embodiments, one or more optical fibers may be placed peripherally, such as being helically arranged. In another specific embodiment, there may be one central optical fiber and one or more, such as three, peripheral optical fibers, such as the one or more peripheral optical fibers being helically arranged. In some embodiments, one optical fiber may have a plurality of optical cores being arranged for e.g. shape-sensing.

A possible advantage of the invention is that the resulting optical data corresponding to the first and second polarization may be easily discernible, since there is no overlap between the between the first polarization (P1) and the second polarization (P2).

According to another embodiment, there is provided an optical frequency domain reflectometry (OFDR) system, wherein the optical detection unit is capable of performing OFDR in the frequency domain and providing a reflection spectrum, the polarization dependent optical path length shifter (PDOPS) being arranged so that the optical path length difference ($\Delta_{PDOS}$) between the first polarization (P1) and the second polarization (P2) in the reflection spectrum is larger than said sensing length ($l_s$) of the fiber. In a specific embodiment the optical path length difference ($\Delta_{PDOS}$) between the first polarization (P1) and the second polarization (P2) in the reflection spectrum is at least 1%, such as 5%, such as 10% such as 50% such as 100% such as 200% larger than said sensing length ($l_s$) of the fiber. A possible advantage of having the optical path length difference ($\Delta_{PDOS}$) between the first polarization (P1) and the second polarization (P2) in the reflection spectrum is larger than said sensing length ($l_s$) of the fiber is that this corresponds to a path length difference being sufficient to avoid overlap.

According to another embodiment, there is provided an optical frequency domain reflectometry (OFDR) system, wherein the first polarization (P1) and the second polarization (P2) are substantially orthogonal as evaluated by the inner product. In some embodiments the absolute value of inner product of the first polarization (P1) and the second polarization (P2) is substantially zero, such as near-zero, such as zero. For non-zero values, certain thresholds may be defined above which the system does not work properly. Preferably, the dot product of the first polarization (P1) and the second polarization (P2) is normalized.

According to another embodiment, there is provided an optical frequency domain reflectometry (OFDR) system, wherein the scan within said wavelength band is performed so that the first and second polarization (P1, P2) are created, or induced, and measured in the detection unit during one single scan of said wavelength band. This is particularly beneficial because time is saved, and reliability and/or accuracy is improved relative to the prior art solutions.

According to another embodiment, there is provided an optical frequency domain reflectometry (OFDR) system, wherein the polarization dependent optical path length shifter (PDOPS) is positioned so as to leave polarization in the reference path undisturbed.

According to another embodiment, there is provided an optical frequency domain reflectometry (OFDR) system, wherein the polarization dependent optical path length shifter (PDOPS) defines a first and a second optical sub-path, the first and the second optical sub-path being defined by a beam splitter separating the radiation into the first and the second optical sub-path when entering the shifter, and a beam combiner arranged for combining radiation from the first and a second optical sub-path.

According to another embodiment, there is provided an optical frequency domain reflectometry (OFDR), wherein the shifter comprises one or more polarization controller(s) (PC) in the first and/or the second optical sub-path.

According to another embodiment, there is provided an optical frequency domain reflectometry (OFDR) system, wherein the shifter comprises a circulator optically connected to a Faraday mirror for creating, or inducing, a first polarization (P1) being different from said second polarization (P2).

According to another embodiment, there is provided an optical frequency domain reflectometry (OFDR) system, wherein the shifter comprises a polarizing beam splitter (PBS) in said beam splitter and/or in said beam combiner.

According to another embodiment, there is provided an optical frequency domain reflectometry (OFDR) system, wherein the shifter comprises a polarization maintaining (PM) fiber in the first and/or in the second optical sub-path.

According to another embodiment, there is provided an optical frequency domain reflectometry (OFDR) system, wherein the first coupling point is optically integrated with the beam splitter of said polarization dependent optical path length shifter (PDOPS), e.g. having one or more common optical elements etc., which may the beneficial with respect to cost savings.

According to a second aspect of the invention, an optical frequency domain reflectometry (OFDR) system is provided, the system comprising a polarization dependent optical path length shifter (PDOPS, PDFS), the shifter having the function of inducing, or creating, a first polarization (P1) and a second polarization (P2) for the radiation in a measurement path, said first polarization (P1) being different from said second polarization (P2), and the shifter further having the function that the optical path length is different for the first polarization (P1) in a measurement path relative to the second polarization (P2) in the measurement path, wherein the polarization dependent optical path length shifter is adapted for cooperating with an associated optical frequency domain reflectometry (OFDR) system, the system comprising:

an optical radiation source capable of emitting optical radiation within a certain wavelength band, the radiation source being optically connected to a first coupling point arranged for splitting the radiation into two parts, the reference path being optically connected to the first coupling point, the measurement path being optically connected to the first coupling point, the measurement path further comprising an optical circulator, the circulator being optically connected to a measurement branch arranged for measurements based on reflected radiation, wherein said reference path and said measurement path are optically coupled in a second coupling point, an optical detection unit capable of obtaining a signal from the combined optical radiation from the reference path and the measurement path via the second coupling point, characterized in that the shifter further having the function that the optical path length is different for the first polarization (P1) in the measurement path relative to the second polarization (P2) in the measurement path, the measurement branch comprises an optical fiber arranged for providing reflections for OFDR along a sensing length ($l_s$) of the optical fiber, and wherein the polarization dependent optical path length shifter (PDOPS) is further arranged so that the optical path length difference ($\Delta_{PDOS}$) between the first polarization (P1) and the second polarization (P2) in the reflection spectrum is chosen so as to avoid overlap in the reflection spectrum between the first polarization (P1) and the second polarization (P2).

According to a third aspect of the invention, a method for obtaining optical frequency domain reflectometry (OFDR) data is provided, the method comprising:

providing an optical radiation source and emitting optical radiation within a certain wavelength band, the radiation source being optically connected to a first coupling point arranged for splitting the radiation into two parts, providing a reference path, the reference path being optically connected to the first coupling point, providing a measurement path, the measurement path being optically connected to the first coupling point, the measurement path further comprising an optical circulator, the circulator being optically connected to a measurement branch arranged for measurements based on reflected radiation, wherein said reference path and said measurement path are optically coupled in a second coupling point, providing an optical detection unit and obtaining a signal from the combined optical radiation from the reference path and the measurement path via the second coupling point, wherein the measurement path comprises a polarization dependent optical path length shifter, the shifter having the function of inducing, or creating, a first polarization and a second polarization for the radiation in the measurement path, said first polarization being different from said second polarization, and characterized in that the shifter further having the function that the optical path length is different for the first polarization (P1) in the measurement path relative to the second polarization (P2) in the measurement path, the measurement branch comprises an optical fiber arranged for providing reflections for OFDR along a sensing length ($l_s$) of the optical fiber, and wherein the polarization dependent optical path length shifter (PDOPS) is further arranged so that the optical path length difference ($\Delta_{PDOS}$) between the first polarization (P1) and the second polarization (P2) in the reflection spectrum is chosen so as to avoid overlap in the reflection spectrum between the first polarization (P1) and the second polarization (P2).

It is understood that the order in which the method steps are listed is not essential.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
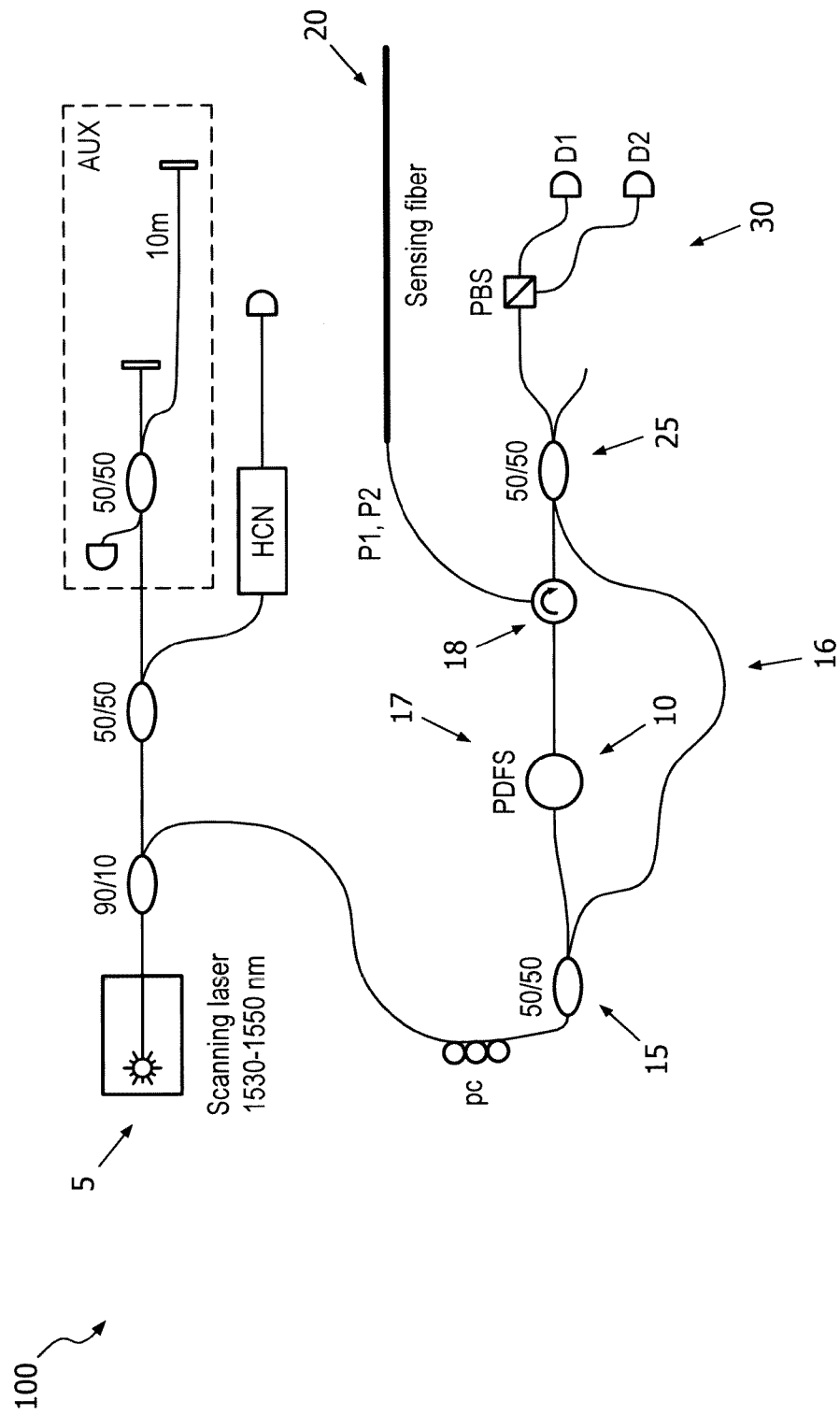
FIG. 1 shows a schematic embodiment of an OFDR system according to the present invention.

An example of how a polarization dependent optical path length shifter (PDOPS) 10, or alternatively named in the following a polarization-diverse frequency shifter (PDFS) because of the shift in the power spectrum, can be incorporated in a measurement system 100 for distributed sensing is shown in FIG. 1.

For purposes of calibration, a fraction of the laser light is sent to a wavelength reference cell, filled with a gas (e.g. HCN) that contains absorption lines with very well-known wavelengths in the range over which the laser is scanned. Part of the laser light is also sent to an auxiliary interferometer (box marked AUX), which generates a signal that is used to linearize the scan. All detector signals are digitized by a signal acquisition system; the digitized signals are sent to a computer for further processing.

Scan linearization is required to ensure a one-to-one correspondence between scatterer position on the fiber and frequency of the detector signal. Linearization can be done in one of several ways. The signal from the auxiliary interferometer can be used to make the laser frequency depend linearly on time, by means of a feedback loop. Another possibility is to use the signal from the auxiliary interferometer to define the sampling moments of the signal acquisition system. Alternatively, all detector signals can be sampled at a constant rate, but the digitized signal from the auxiliary interferometer is used as input to a resampling algorithm that computes interpolated signals corresponding to a precisely linear scan.

The PDFS 10 is incorporated in only the measurement arm or branch 17 of the interferometer system 100, so it is located after the first splitter 15, and because it needs to send two polarizations P1 and P2 through the sensing fiber 20 it is located in the measurement arm before the circulator 18 to which the sensing fiber is connected.

In general, the optical frequency domain reflectometry (OFDR) system 100 comprises an optical radiation source 5, e.g. a laser, capable of emitting optical radiation within a certain wavelength band, e.g. 1530-1550 nm, the radiation source being optically connected to a first coupling point, or splitter, 15 arranged for splitting the radiation into two parts:

into a reference path 16, the reference path being optically connected to the first coupling point 15, and into a measurement path 17, the measurement path being optically connected to the first coupling point 15, the measurement path further comprising an optical circulator 18, the circulator being optically connected to a measurement branch, or sensing fiber, 20 arranged for measurements based on reflected radiation.

The reference path and said measurement path are optically coupled in a second coupling point 25 as shown in FIG. 1.

An optical detection unit 30 is capable of obtaining a signal, e.g. from detectors D1 and D2, from the combined optical radiation from the reference path and the measurement path via the second coupling point 25, and accordingly obtain a scattering profile indicative of desired propertie(s) in the measurement branch 20.

The measurement path 17 comprises a polarization dependent optical path length shifter (PDOPS, or PDFS as shown in the FIG. 10, the shifter having the function of inducing, or creating, a first polarization P1 and a second polarization P2 for the radiation in the measurement path 17, said first polarization P1 being different from said second polarization P2, and the shifter 10 further having the function that the optical path length is different for the first polarization P1 in the measurement path relative to the second polarization P2 in the measurement path 17.

Figure 2:
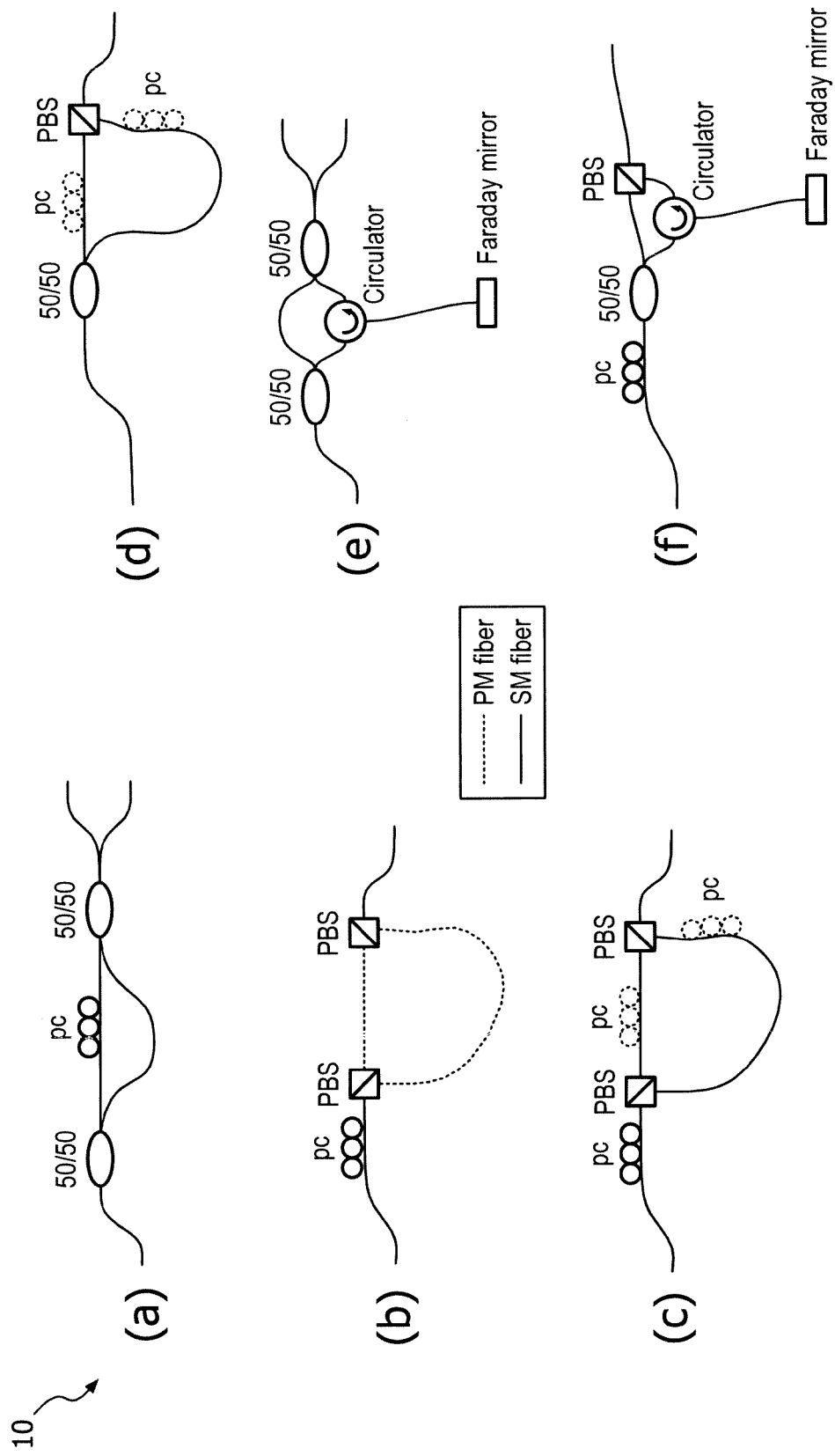
FIG. 2 shows embodiments (a to f) of the polarization dependent optical path length shifter (PDOPS, PDFS) according to the present invention.

FIG. 2 shows embodiments (a to f) of the polarization dependent optical path length shifter (PDOPS, PDFS) 10 according to the present invention. A brief description will now be given of the properties of the different embodiments of the PDFSs shown in FIG. 2.

Figure 4:
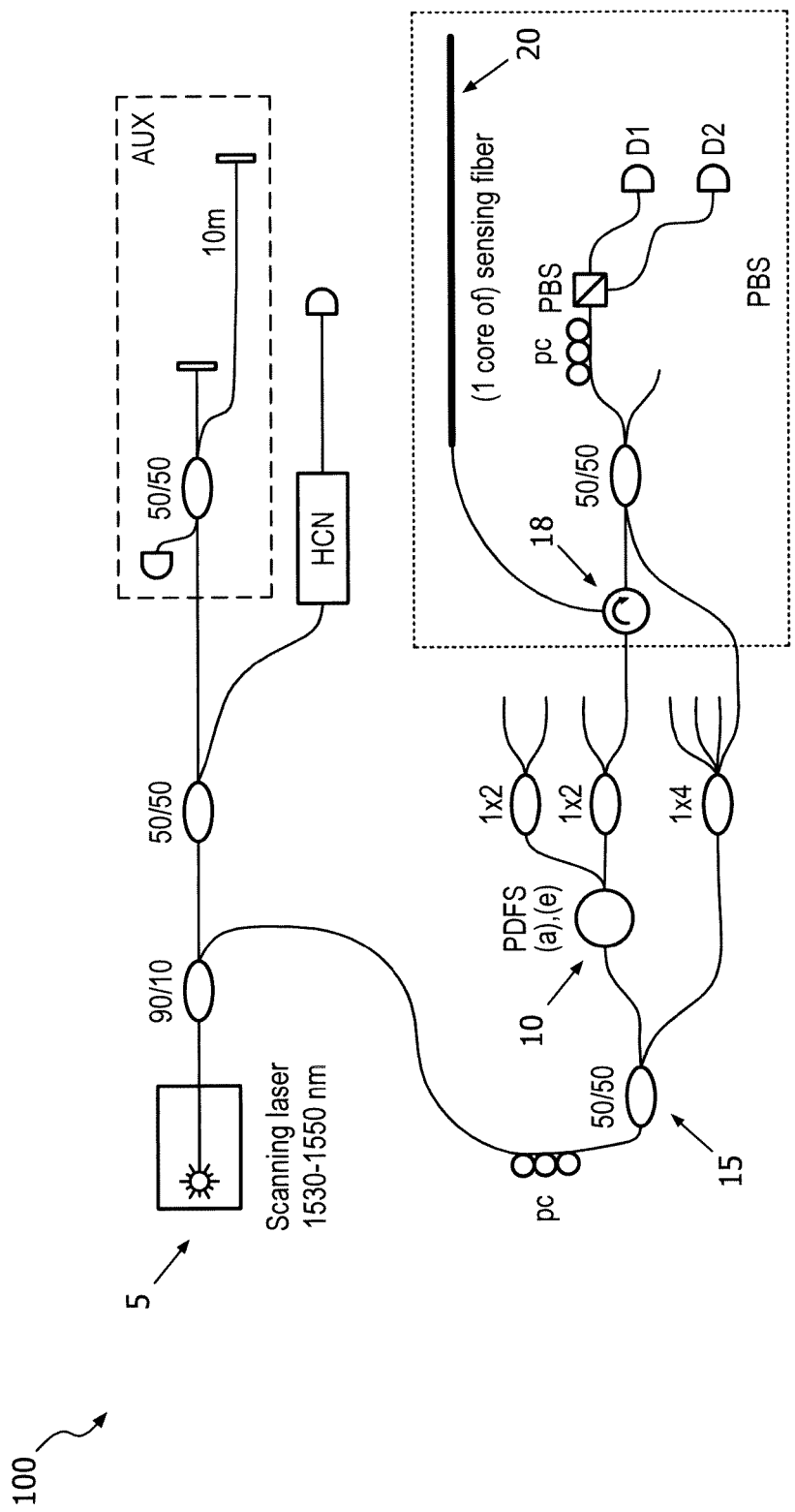
FIG. 4 shows another schematic embodiment of an OFDR system suitable for multiple sensing fibers according to the present invention.

Embodiment (a) has a 50/50 splitter as its splitting element to divide the light over the two branches. This splitting element does not create two orthogonal polarizations, so in this embodiment an additional component is present in one of the branches to modify the polarization, so that the polarization in this branch is orthogonal to the polarization of the other branch upon arrival at the combining element. A polarization controller pc (abbreviation 'pc' used in all Figures) is used that operates in transmission for this purpose. This polarization controller can consist of one or more loops of fiber of which the orientation can be manipulated, but can also be a (commercially available) polarization controller in which, e.g., birefringence of electro-optical materials is controlled by electrical voltages, or in which fiber birefringence is modified by external stresses. The light from the two branches is combined in a 50/50 combiner. The polarization controller is adjusted to create a polarization state that is orthogonal to the polarization from the other branch at the combiner. However, as the combiner does not modify the incoming polarization states, the polarization states of the two branches do not necessarily need to be orthogonal, e.g. a combination of a linear and circular state can be created, if so desired. The combiner has two output fibers; in a measurement system for only a single fiber only one of these output fibers would be needed and half of the light would be lost, but in systems designed for measuring multiple fibers simultaneously both outputs can be used, as is shown in FIG. 4, which shows, as an example, a system that can measure four fibers (or four cores of a multi-core fiber).

Embodiment (b) has a polarizing beam splitter (PBS) as its splitting component, which creates two linearly polarized orthogonal polarization states. To ensure that these polarization states contain approximately equal optical power, the polarization of the light at the input of the PBS needs to be adjusted such that this is the case. In FIG. 2, a separate polarization controller is shown to perform this task, but this polarization controller may not be needed when another polarization controller is already present in the system between the laser and the PDFS, as is the case in the example system shown in FIG. 2. In Embodiment (b), a second PBS is used to combine the light from the two branches into a single output branch. Polarization maintaining (PM) fibers are used for the two branches of this embodiment, ensuring that the polarization states of the two branches at the combiner PBS are aligned with the PBS axes. The use of a PBS as a combiner implies that the output states are orthogonal and linearly polarized.

Embodiment (c) is similar to embodiment (b), but in embodiment (c) standard single-mode fibers are used for the two branches. As these fibers are not guaranteed to maintain polarization, the polarization states of the two branches upon arrival at the combining PBS may no longer be linear and aligned with the polarization axes of the combiner PBS. Although the combiner PBS cleans up the polarization states of the light coming from the two branches so that linear, orthogonal, states end up in the output fiber, power may be lost. To minimize power losses, the two branches can be equipped with polarization controllers (shown dotted in the Figure).

Embodiment (d) has a 50/50 splitter as its splitting element to divide the light over the two branches. Standard single-mode fibers are used for the two branches. Embodiment (d) uses a PBS as a combiner, thus ensuring that the polarization states of the two branches always result in two linearly polarized orthogonal states in the output. The optical power in the output states depends on the polarization states of the two branches at the combiner PBS in relation to the orientation of the PBS axes; the power transmission will be maximized when the light from the two branches is linearly polarized and parallel to the respective PBS axes. To achieve maximum power, the two branches can be equipped with polarization controllers (shown dotted in the Figure). Alternatively, a polarization controller in only one of the branches in combination with a polarization controller before the splitter can be used (not shown in the Figure). In the latter case, the polarization controller before the splitter can be omitted if another polarization controller pc is already present in the system between the laser and the PDFS, as is the case in the example system shown in FIG. 1.

Embodiment (e) has a 50/50 splitter as its splitting element to divide the light over the two branches. In one of the branches, the polarization is changed to an orthogonal state by a Faraday mirror attached to a circulator. In this embodiment, it is preferred to have short connecting fibers between the splitter and circulator, between circulator and combining element and between splitter and combining element, to make it easier to retain the orthogonality of the polarization states of the two branches. The light from the two branches is combined in a 50/50 combiner. As is the case in embodiment (a), the combiner has two output fibers; in a measurement system for only a single fiber only one of these output fibers would be needed and half of the light would be lost, but in systems designed for measuring multiple fibers simultaneously both outputs can be used, as is shown in FIG. 4.

Figure 3:
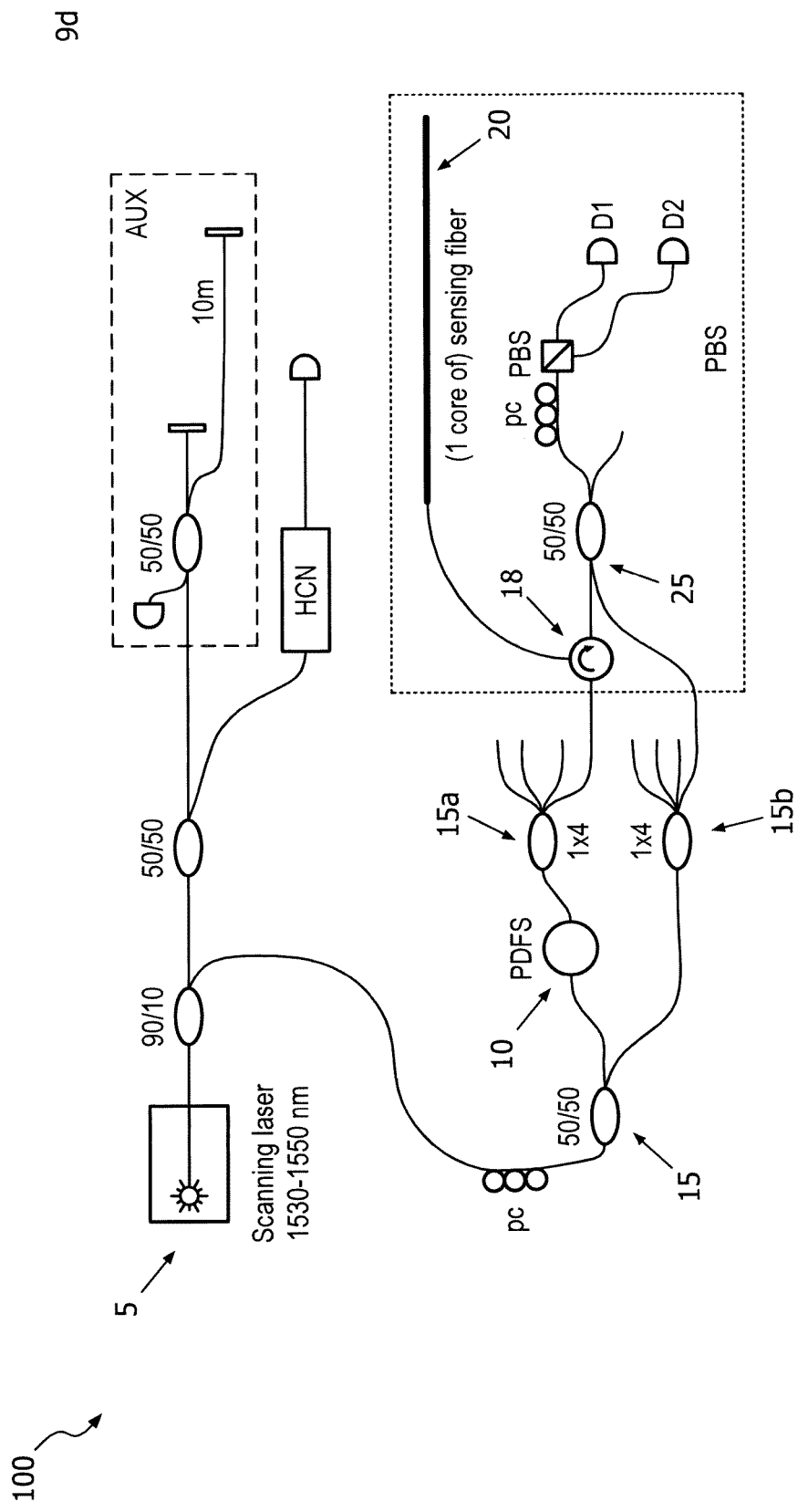
FIG. 3 shows a schematic embodiment of an OFDR system suitable for multiple sensing fibers according to the present invention.

Embodiment (f) is similar to embodiment (e), in that it has a 50/50 splitter as its splitting element to divide the light over the two branches and that, in one of the branches, the polarization is changed to an orthogonal state by a Faraday mirror attached to a circulator. It differs from embodiment (e) in that it uses a PBS as combining element. To minimize power losses, the polarization state of the branch without circulator and Faraday mirror should be linear and parallel to one of the PBS axes at the combiner; the polarization state at the combiner of the branch containing the circulator and Faraday mirror is then automatically linear and parallel to the other PBS axis when the connecting fibers between the splitter and circulator, between circulator and PBS and between splitter and PBS are kept short enough to not modify the polarization state significantly FIG. 3 shows a schematic embodiment of an OFDR system 100 suitable for multiple sensing fibers according to the present invention. An example of how a PDFS can be incorporated in a system for measuring several fibers of approximately the same length simultaneously using multiple interferometers is shown in FIG. 3. A primary splitter 15 first divides the light over two branches. One of the branches will be a common part of the reference arms of all interferometers, while the other branch will be a common part of the measurement arm of all interferometers. Secondary splitters, 15a and 15b, respectively are inserted in the measurement branch and the reference branch created by the first splitter 15, in order to create multiple interferometers. The PDFS is located in the branch that constitutes the common part of the measurement arm of all interferometers, between the first splitter and the circulators in the measurement arm of all interferometers. In FIG. 3, the PDFS 10 is located between the primary splitter 15 and the secondary splitter 15a, so that the two polarizations created by the PDFS are distributed to all sensing fibers 20 (only one shown), and the path length difference between the two polarization states is the same for all measurement arms. This is a desirable situation when the lengths of the sensing part of all sensing fibers are comparable. When the lengths of the sensing fibers are very different, it may be desirable to have a separate PDFS for each measurement arm (not shown in a figure), in order to be able to create a path length difference of the measurement arm for the two polarizations that is adapted to the length of the sensing fiber connected to that measurement arm. In the latter case, the location of each PDFS in its respective measurement arm would be between the secondary splitter 15a and the circulator 18.

FIG. 4 shows another schematic embodiment of an OFDR system 100 suitable for multiple sensing fibers according to the present invention. FIG. 4 shows another example of a setup for measuring multiple fibers. The setup shown in FIG. 4 is particularly suited for PDFS embodiments that have two output fibers. In this case, the PDFS 10 can provide part of the functionality of the secondary splitter.

Common to all implementations of one or more PDFSs in measurement systems for one or more fibers 20 is that each PDFS is located in the measurement arm 17 between the primary splitter 15 and the circulator(s) 18.

It can be shown that one unit change of fiber index corresponds to a change of path length difference of the interferometer equal to $$\Delta l = \frac{\lambda_c^2}{n \cdot \Delta \lambda}, \quad (1)$$

where n is the group index in the interferometer, $\lambda_c$ is the center of the desired wavelength range of the laser scan and $\Delta \lambda$ the desired range. The output of the Discrete Fourier Transform is in the form of discrete bins, which are referred to by their index number. As explained earlier, these bins correspond to positions along the fiber. The zero-frequency bin corresponds to the (possibly virtual) point on the fiber for which the length of the measurement branch and the reference branch are equal, as explained below. For a sensing fiber that is used in reflection, a path length difference of $\Delta l$ is equivalent to a change of position along the sensing fiber of $\Delta z = \Delta l/2$, so a unit change of fiber index corresponds to a change of position along the sensing fiber equal to $$\Delta z = \frac{\lambda_c^2}{2n \cdot \Delta \lambda}. \quad (2)$$

In the example measurement, $\lambda_c$=1540 nm, $\Delta\lambda$=20 nm and n≈1.48, resulting in $\Delta z$≈40 μm. The fiber index range of approximately 50000-100000 containing Fiber Bragg Gratings thus corresponds to a section of fiber that is 2 to 4 meters distant from the point on the sensing fiber for which the length of the measurement arm is equal to the length of the reference arm.

Figure 5:
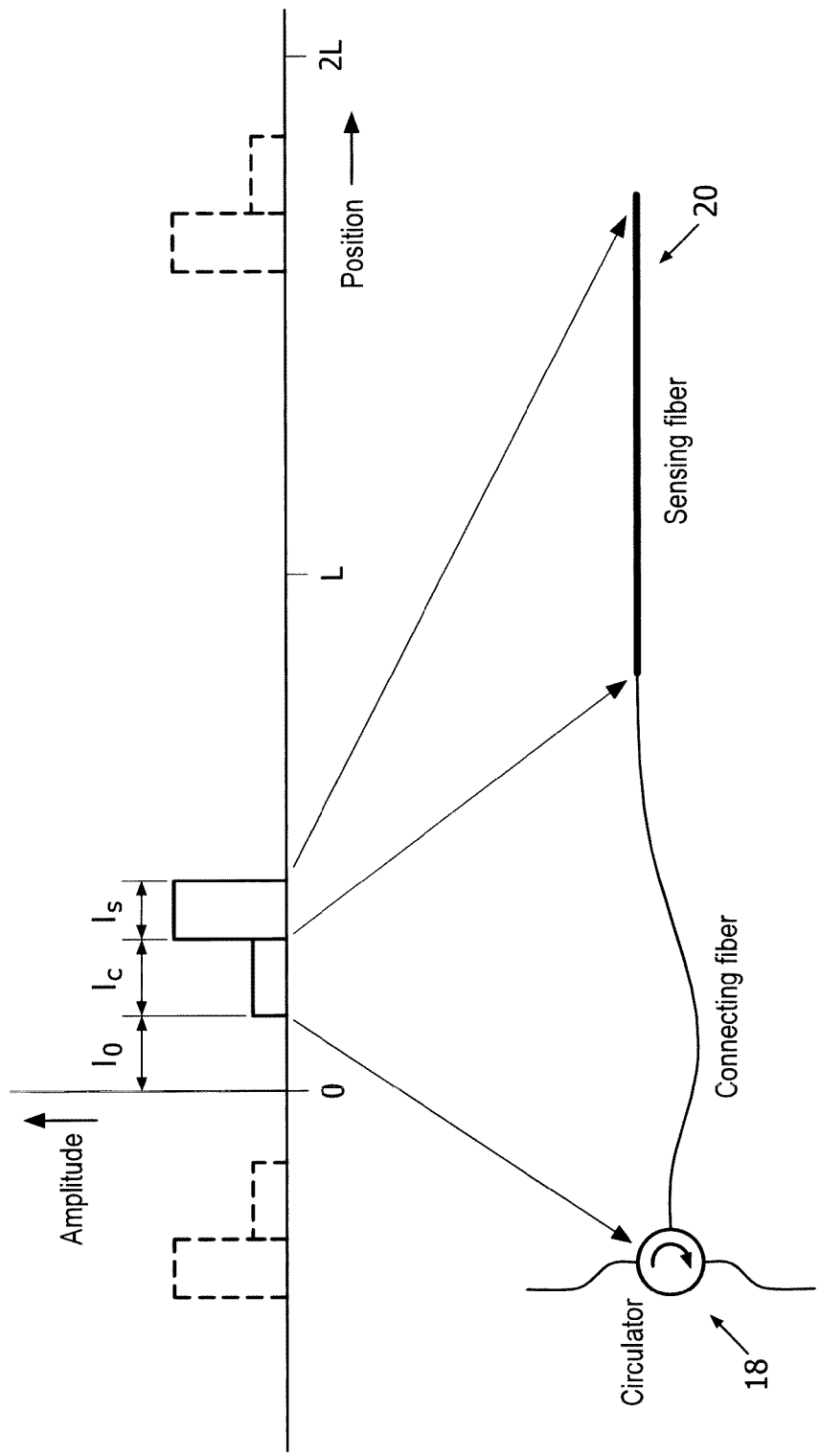
FIG. 5 shows a schematic diagram of the scattering profile of a sensing fiber with length $l_s$, connected to the circulator via a connecting fiber with length $l_c$.

FIG. 5 shows a schematic diagram of the scattering profile of a sensing fiber with length $l_s$, connected to the circulator via a connecting fiber with length $l_c$. These could also be different parts of the same fiber, the sensing part only differing from the connection part by its intended use (when using Rayleigh scattering), or by being specially prepared (e.g. with Fiber Bragg gratings (FBG) being prepared therein).

Discrete Fourier Transforms (DFTs) of the measured detector signals are used to arrive at the scattering profile of the sensing fiber. Neighboring points of a Fourier transform correspond to points on the sensing fiber that are a distance $\Delta z$ apart, with $\Delta z$ given by Eq. (2) above.

The zero-frequency point of the computed Fourier transform (fiber-index equal to 0) corresponds to the (possibly virtual) point on the sensing fiber for which the lengths of the reference arm and the measurement arm of the interferometer are equal. For an N-point DFT, the maximum frequency (fiber-index N/2) corresponds to a (possibly virtual) point on the sensing fiber that is at a distance L from the zero-frequency point, with L given by $$L = \frac{N}{2}\Delta z. \quad (3)$$

The points with fiber indices in the range N/2+1 ... N−1 correspond to negative frequencies. In one example, N=$10^6$ and $\Delta z$=40 μm, so L=20 m.

Consider a sensing fiber of length $l_s$ attached to the circulator of the measurement system via a connecting fiber of length $l_c$. These could again be different parts of the same fiber, the sensing part only differing from the connection part by its intended use (when using Rayleigh scattering), or by being specially prepared (e.g. with Fiber Bragg gratings being written therein). Backscattered light from both the sensing fiber and the connecting fiber will reach the detectors, and will end up in the computed scattering profile. No backscattered light will reach the detectors from (virtual) positions that lie before the circulator or after the physical end of the sensing fiber. Thus, the use of a circulator to connect the sensing fiber to the measurement system ensures that the backscattered light from the connecting fiber and the sensing fiber occupies a space of limited extent in the scattering profile. FIG. 5 schematically shows the contributions of the connecting fiber and the sensing fiber to the computed scattering profile for the case that the equal-length point lies at a distance $l_0$ to the left of the start of the connecting fiber. The (virtual) point for which the measurement arm and reference arm have equal length lies at a distance $l_0$ to the left of the starting point of the connecting fiber.

All PDFS embodiments of FIG. 2 have two optical sub-paths or branches with different lengths. The difference in length between the two branches of a PDFS causes the measurement arm of the interferometer to have a different length for the two polarization states created by the PDFS. Consequently, the zero-frequency point of the Fourier transform of a detector signal corresponds to one point on the sensing fiber for the first polarization state created by the PDFS, and to another point on the sensing fiber for the second polarization state, or, equivalently, any part of the sensing fiber ends up at two different positions in the computed scattering profile for the two different polarization states that are created by the PDFS. The distance between these positions, expressed in meters, will be called $\Delta_{PDFS}$ or $\Delta_{PDOPS}$; the difference in length between the two branches of the PDFS (length of branch 2 minus length of branch 1) that is required to cause this shift is equal to $2\Delta_{PDFS}$. See Eq. (2) for the conversion factor between fiber index and position.

The shift between the two positions should be chosen in such a manner that the data coming from the sensing fiber is not contaminated for either of the two polarization states. At the very least, this implies that the sensing fiber data for the two polarizations do not overlap in the scattering profile, giving rise to the condition $$\Delta_{PDFS} > l_s \quad (4)$$

When the shift $\Delta_{PDFS}$ is only slightly larger than the length $l_s$ of the sensing fiber, the sensing fiber data of polarization P1 will overlap with the connecting fiber data of polarization P2. When the scattered signal of the sensing fiber is much stronger than the Rayleigh scattering of the connecting fiber this may be acceptable, but very often the connecting fiber data also contains spurious reflections from connectors, fiber splices etc. that are strong enough to contaminate overlapping sensing fiber data. In this case, or in the case that the signal of the sensing fiber and the connecting fiber are of comparable strength, it would be wise to increase the shift $\Delta_{PDFS}$ to a larger value, to prevent any overlap:

$$\Delta_{PDFS} > l_s + l_c \quad (5a)$$

Figure 6:
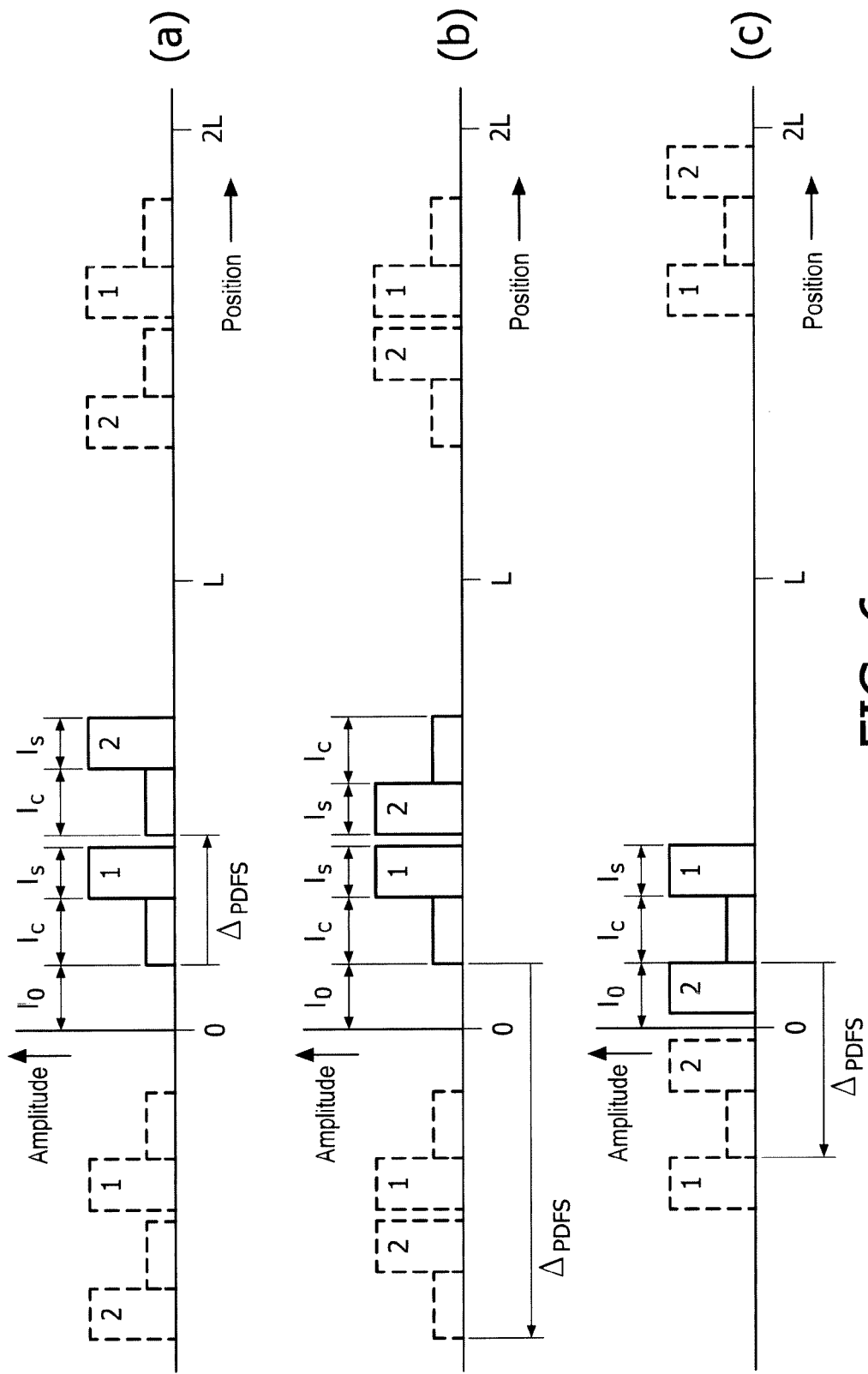
FIG. 6 shows some examples of relative positions of the contributions of the two polarizations to the computed scattering profile.

FIG. 6 shows some examples of relative positions of the contributions of the two polarizations to the computed scattering profile.

The above case is shown in FIG. 6(a). The shift cannot be made arbitrarily large, as the sensing fiber data for polarization P2, indicated just '2' in FIG. 6, would then start to overlap with its negative frequency part (an equivalent way of describing this situation would be: the sampling density becomes insufficient and aliasing starts to occur). Thus, the following condition should also be met:

$$l_0 + \Delta_{PDFS} + l_c + l_s < L \quad (5b)$$

Equations 5(a) and 5(b) can be combined into a single equation:

$$l_c + l_s < \Delta_{PDFS} < L - (l_0 + l_c + l_s) \quad (5c)$$

It is also possible to place the zero-frequency point for polarization P1, indicated just '1' in FIG. 6, somewhere in the connecting fiber, in which case $l_0$ will be negative. To avoid overlap, the following condition should then hold in addition to the condition represented by Eq. (5c):

$$l_0 > -l_c/2 \quad (6)$$

More possibilities exist. The shift $\Delta_{PDFS}$ can be made negative, in such a manner that for all points on the sensing fiber the measurement arm for polarization P1 is longer than the reference arm, while for polarization P2 the measurement arm is shorter than the reference arm. The data for polarization P2 then appear reversed in position along the fiber. Depending on the magnitude of $\Delta_{PDFS}$ two situations can be distinguished:

Firstly, when the sensing fiber data for polarization P2 appear to the right of the sensing fiber data for polarization P1, we have the situation shown in FIG. 6(b). For this case the following condition must hold in order to avoid overlap (keep in mind that $\Delta_{PDFS}$ is negative):

$$2(l_s + l_c + l_0) < |\Delta_{PDFS}| < L + l_0 + l_c/2 \quad (7)$$

When the zero-frequency point is located in the connecting fiber, the condition represented by Eq. (6) must hold in addition.

Secondly, provided $l_0$ is sufficiently large, another possibility in the case of negative $\Delta_{PDFS}$ is to place the data part for polarization P2 into the empty space above the zero-frequency point, as shown in FIG. 6(c). The immediate vicinity of the zero-frequency point should be avoided, however, as various noise contributions associated with the DC intensity on the detector will be located here. The width of the region to be avoided will be accounted for by an additional parameter $\delta$. The following conditions should then hold:

$$l_0 > l_s + \delta \quad (8a)$$

$$l_s + l_c + l_0 + \delta < |\Delta_{PDFS}| < 2l_0 + l_c \quad (8b)$$

Figure 7:
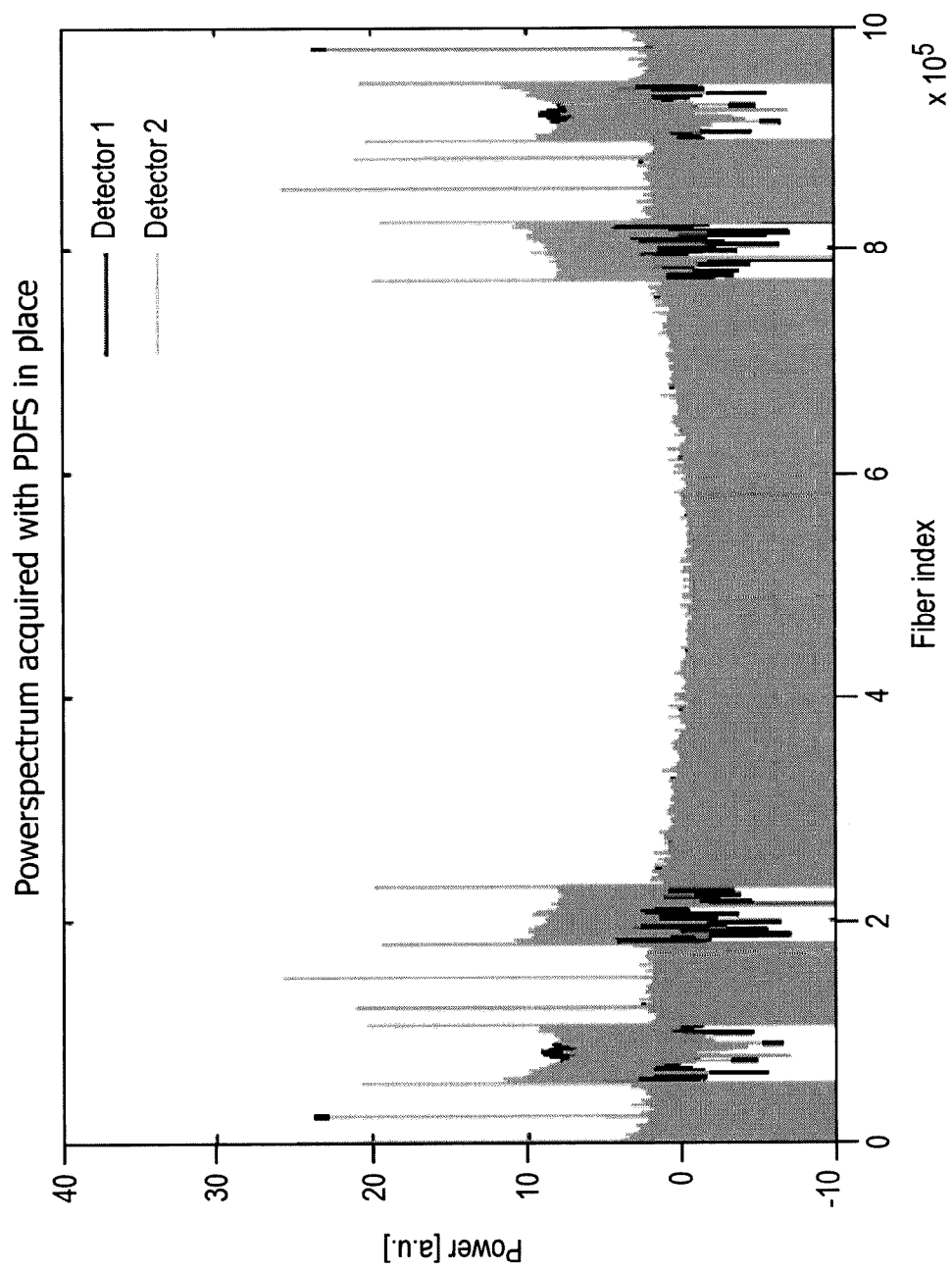
FIG. 7 shows a graph with the Fourier transform (power spectrum) of a measurement with a setup according to FIG. 1, using a PDOPS, or PDFS, according to the embodiment of FIG. 2 (a)

FIG. 7 shows a graph with the Fourier transform (power spectrum) of a measurement with a setup according to FIG. 1, using a PDOPS, or PDFS, according to the embodiment of FIG. 2 (a). FIG. 7 shows the computed scattering profile of a single-scan measurement performed with a system incorporating the invention according to FIG. 1, in which a PDFS according to embodiment (a) of FIG. 2 has been used. For polarization P1, the sensing part of the fiber appears in the scattering profile in the (approximate) index range 55000-105000; for polarization P2 the index range is approximately 180000-230000. The shift $\Delta_{PDFS}$ is about 125000 fiber indices, or approximately 5 meters, corresponding to 10 m length difference between the branches of the PDFS.

Figure 8:
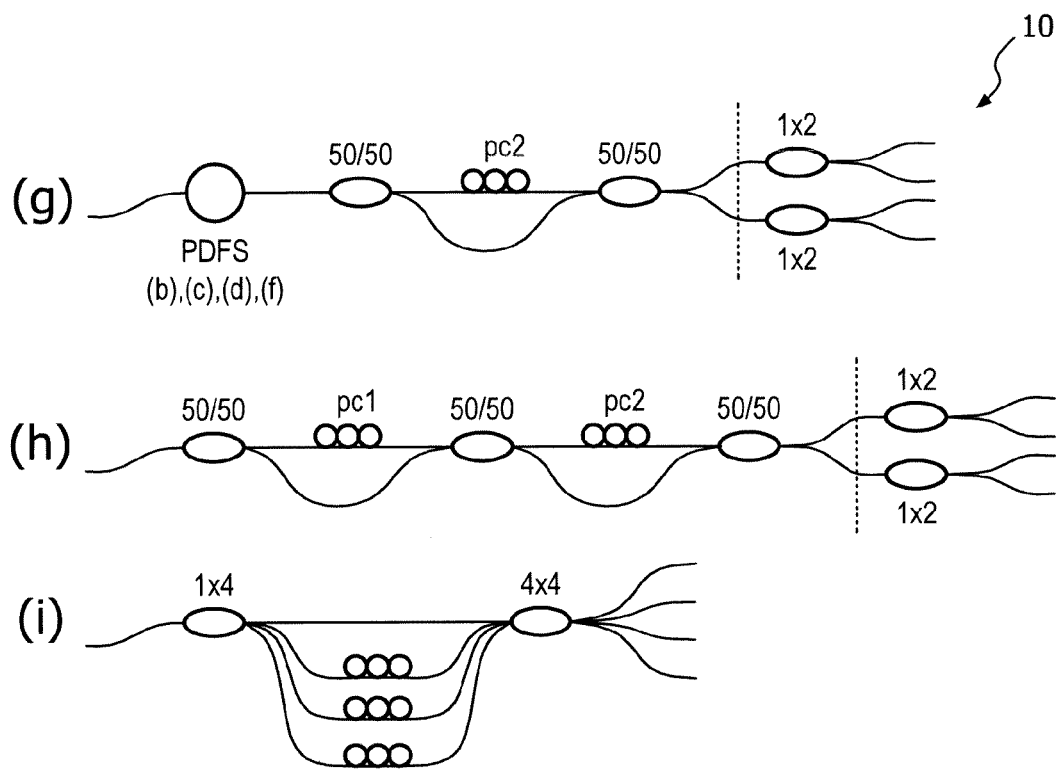
FIG. 8 shows three embodiments of a PDOPS, or PDFS, were more than two output polarizations are required.

FIG. 8 shows three embodiments (g to i) of a PDOPS, or PDFS, 10 where more than two output polarizations are required. In the above, it has been assumed that the sensing fiber needs to be measured for only two input polarizations. In case more than two polarizations are desired, e.g. left and right circularly polarized light in addition to linearly polarized light, it is possible to expand the PDFS to create e.g. 4 polarization states, each with different length. Some examples of embodiments that might create these states are shown in FIG. 8. More polarizations are of course possible, and within reach of the skilled person once the general principle of the present invention is comprehended.

In FIG. 8 (g), a first single-output PDFS from FIG. 2 is followed by a second PDFS that, in one of the branches, modifies the two linear polarizations coming out of the first PDFS to left and right circularly polarized light by a polarization controller that effectively acts as a properly oriented quarter-wave plate. The embodiment as shown is designed for a system for the simultaneous measurement of 4 fibers, as in FIG. 4; in case fewer fibers need to be measured the couplers to the right of the dotted vertical line can be omitted.

The embodiment of FIG. 8 (*h*) is a concatenation of a dual-output PDFS according to the embodiment of FIG. 2 (*a*) and a section that acts as a quarter-wave plate in one of its branches to create left and right circularly polarized light.

The embodiment of FIG. 8 (*i*) is a 'brute-force' approach in which 4 different polarization states with differing branch lengths are created with a 1×4 splitter and separate polarization controllers as indicated with the adjacent, triple circles (it is assumed that the setup in which this embodiment is used contains a polarization controller preceding the PDFS; if this is not the case, all four branches might contain a polarization controller pc). The advantage of this embodiment is its flexibility—it can also be used if the desired output polarization states are not pair-wise orthogonal.

Figure 9:
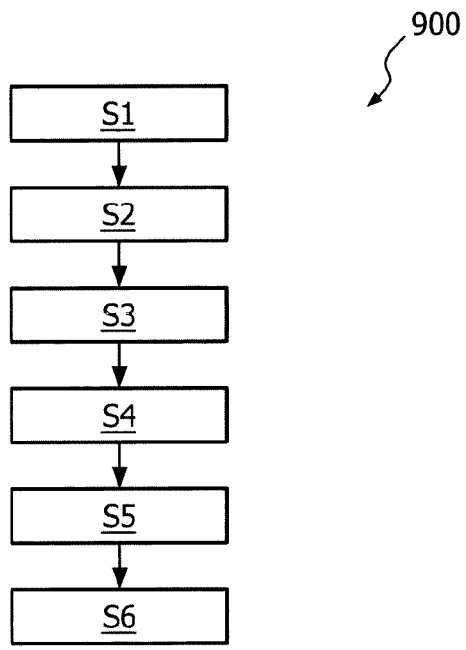
FIG. 9 shows a flow chart of a method according to the present invention.

FIG. 9 shows a flow chart of a method according to the present invention. More particularly, FIG. 9 shows a method 900 for obtaining optical frequency domain reflectometry (OFDR) data, the method comprising:

Providing S1 an optical radiation source 5 and emitting S2 optical radiation within a certain wavelength band, the radiation source being optically connected to a first coupling point 15 arranged for splitting the radiation into two parts, Providing S3 a reference path 16, the reference path being optically connected to the first coupling point, Providing S4 a measurement path 17, the measurement path being optically connected to the first coupling point, the measurement path further comprising an optical circulator 18, the circulator being optically connected to a measurement branch 20 arranged for measurements based on reflected radiation, wherein said reference path and said measurement path are optically coupled in a second coupling point 25, providing S5 an optical detection unit 30 and obtaining S6 a signal from the combined optical radiation from the reference path and the measurement path via the second coupling point, wherein the measurement path 17 comprises a polarization dependent optical path length shifter (PDOPS, PDFS) 10, the shifter having the function of inducing, or creating, a first polarization P1 and a second polarization P2 for the radiation in the measurement path, said first polarization P1 being different from said second polarization P2, and the shifter further having the function that the optical path length is different for the first polarization P1 in the measurement path relative to the second polarization P2 in the measurement path.

To sum up, there is presented an optical frequency domain reflectometry (OFDR) system 100 comprising a first coupling point 15 arranged for splitting radiation into two parts, so that radiation may be emitted into a reference path 16 and a measurement path 17. The system further comprises an optical detection unit 30 capable of obtaining a signal from the combined optical radiation from the reference path and the measurement path via a second coupling point 25. The measurement path 17 comprises a polarization dependent optical path length shifter (PDOPS, PDFS) 10, which may create a first polarization (P1) and a second polarization (P2) for the radiation in the measurement path, where the optical path length is different for the first and second polarizations in the measurement path. This may be advantageous for obtaining an improved optical frequency domain reflectometry (OFDR) system where e.g. the two measurements for input polarizations may be performed in the same scan of a radiation source.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, or the description, the mentioning of "at least one of a first entity, a second entity, and third entity" does not necessarily mean that each of the first entity, the second entity, and third entity are present, hence only the second entity may be present, or alternatively, only the first entity and third entity may be present, and so forth with more entities. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An optical frequency domain reflectometry (OFDR) system, the system comprising:
    an optical radiation source capable of emitting optical radiation within a certain wavelength band, the radiation source being optically connected to a first coupling point arranged for splitting the radiation into two parts,
    a reference path, the reference path being optically connected to the first coupling point,
    a measurement path, the measurement path being optically connected to the first coupling point, the measurement path further comprising an optical circulator, the circulator being optically connected to a measurement branch arranged for measurements based on reflected radiation,
    wherein said reference path and said measurement path are optically coupled in a second coupling point,
    an optical detection unit capable of obtaining a signal from the combined optical radiation from the reference path and the measurement path via the second coupling point,
    wherein the measurement path comprises a polarization dependent optical path length shifter, the shifter having the function of inducing, or creating, a first polarization and a second polarization for the radiation in the measurement path, said first polarization being different from said second polarization, and
    characterized in that
    the shifter further having the function that the optical path length is different for the first polarization in the measurement path relative to the second polarization in the measurement path, the measurement branch comprises an optical fiber arranged for providing reflections for OFDR along a sensing length of the optical fiber, and wherein the polarization dependent optical path length shifter is further arranged so that the optical path length difference between the first polarization and the second polarization in the reflection spectrum is chosen so as to avoid overlap in the reflection spectrum between the first polarization and the second polarization.

2. The optical frequency domain reflectometry system according to claim 1, wherein the optical detection unit is capable of performing OFDR in the frequency domain and providing a reflection spectrum, the polarization dependent optical path length shifter being arranged so that the optical path length difference between the first polarization and the second polarization the reflection spectrum is larger than said sensing length of the fiber.

3. The optical frequency domain reflectometry system according to claim 1, wherein the first polarization and the second polarization are substantially orthogonal as evaluated by the inner product.

4. The optical frequency domain reflectometry system according to claim 1, wherein the scan within said wavelength band is performed so that the first and second polarization are created, or induced, and measured in the optical detection unit during one single scan of said wavelength band.

5. The optical frequency domain reflectometry system according to claim 1, wherein the polarization dependent optical path length shifter is positioned so as to leave polarization in the reference path undisturbed.

6. The optical frequency domain reflectometry system according to claim 1, wherein the polarization dependent optical path length shifter defines a first and a second optical sub-path, the first and the second optical sub-path being defined by a beam splitter separating the radiation into the first and the second optical sub-path when entering the shifter, and a beam combiner arranged for combining radiation from the first and a second optical sub-path.

7. The optical frequency domain reflectometry system according to claim 6, wherein the shifter comprises one or more polarization controller(s) in the first and/or the second optical sub-path.

8. The optical frequency domain reflectometry system according to claim 6, wherein the shifter comprises a circulator optically connected to a Faraday mirror for creating, or inducing, a first polarization being different from said second polarization.

9. The optical frequency domain reflectometry system according to claim 6, wherein the shifter comprises a polarizing beam splitter in said beam splitter and/or in said beam combiner.

10. The optical frequency domain reflectometry system according to claim 6, wherein the shifter comprises a polarization maintaining fiber in the first and/or in the second optical sub-path.

11. The optical frequency domain reflectometry system according to claim 6, wherein the first coupling point is optically integrated with the beam splitter of said polarization dependent optical path length shifter.

12. A polarization dependent optical path length shifter, the shifter having the function of inducing, or creating, a first polarization and a second polarization for the radiation in a measurement path, said first polarization being different from said second polarization, and the shifter further having the function that the optical path length is different for the first polarization in a measurement path relative to the second polarization in the measurement path, wherein the polarization dependent optical path length shifter is adapted for cooperating with an associated optical frequency domain reflectometry system, the system comprising:

an optical radiation source capable of emitting optical radiation within a certain wavelength band, the radiation source being optically connected to a first coupling point arranged for splitting the radiation into two parts, the reference path being optically connected to the first coupling point, the measurement path being optically connected to the first coupling point, the measurement path further comprising an optical circulator the circulator being optically connected to a measurement branch arranged for measurements based on reflected radiation, wherein said reference path and said measurement path are optically coupled in a second coupling point, an optical detection unit capable of obtaining a signal from the combined optical radiation from the reference path and the measurement path via the second coupling point, characterized in that the shifter further having the function that the optical path length is different for the first polarization in the measurement path relative to the second polarization in the measurement path, the measurement branch comprises an optical fiber arranged for providing reflections for OFDR along a sensing length of the optical fiber, and wherein the polarization dependent optical path length shifter is further arranged so that the optical path length difference between the first polarization and the second polarization in the reflection spectrum is chosen so as to avoid overlap in the reflection spectrum between the first polarization and the second polarization.

13. A method for obtaining optical frequency domain reflectometry data, the method comprising:

providing an optical radiation source and emitting optical radiation within a certain wavelength band, the radiation source being optically connected to a first coupling point arranged for splitting the radiation into two parts, providing, a reference path, the reference path being optically connected to the first coupling point, providing a measurement path, the measurement path being optically connected to the first coupling point, the measurement path further comprising an optical circulator, the circulator being optically connected to a measurement branch arranged for measurements based on reflected radiation, wherein said reference path and said measurement path are optically coupled in a second coupling point, providing (S5) an optical detection unit and obtaining a signal from the combined optical radiation from the reference path and the measurement path via the second coupling point, wherein the measurement path comprises a polarization dependent optical path length shifter, the shifter having the function of inducing, or creating, a first polarization and a second polarization for the radiation in the measurement path, said first polarization being different from said second polarization, and the shifter further having the function that the optical path length is different for the first polarization in the measurement path relative to the second polarization in the measurement path, characterized in that the shifter further having the function that the optical path length is different for the first polarization in the measurement path relative to the second polarization in the measurement path, the measurement branch comprises an optical fiber arranged for providing reflections for OFDR along a sensing length of the optical fiber, and
wherein the polarization dependent optical path length shifter is further arranged so that the optical path length difference between the first polarization and the second polarization in the reflection spectrum is chosen so as to avoid overlap in the reflection spectrum between the first polarization and the second polarization.

* * * * *